United States Patent [19]
Weick

[11] Patent Number: 6,018,135
[45] Date of Patent: Jan. 25, 2000

[54] LASER MACHINE WITH GAS VOLUME COMPENSATION

[75] Inventor: Jürgen-Michael Weick, Asperg, Germany

[73] Assignee: Trumpf GmbH & Co., Ditzingen, Germany

[21] Appl. No.: 09/133,342

[22] Filed: Aug. 13, 1998

[30] Foreign Application Priority Data

Aug. 13, 1997 [DE] Germany .................. 297 14 489 U

[51] Int. Cl.[7] .................................................. B23K 26/10
[52] U.S. Cl. ................................ 219/121.79; 219/121.6
[58] Field of Search ........................... 219/121.6, 121.67, 219/121.78, 121.84, 121.73, 121.79

[56] References Cited

U.S. PATENT DOCUMENTS 5,897,800  4/1999  Sawai et al. .................. 219/121.6 X

FOREIGN PATENT DOCUMENTS 0 336 972 A1  10/1989  European Pat. Off. .
295 09 648 U  10/1995  Germany .
WO 95/33594  12/1995  WIPO .

*Primary Examiner*—Gregory Mills

[57] ABSTRACT

A laser processing machine has a laser beam generator (2), a processing head (4) movable relative thereto, and a gas chamber (10) connected to a gas compensating chamber (15). The gas chamber (10) provides at least part of the beam guidance chamber (6) for the laser beam (5), and at least partially is bordered by a expansible and compressible gas chamber wall (11, 12) which expands and compresses with the motion of the processing head (4) relative to the laser beam generator (2). The guidance gas chamber (10) is essentially closed apart from the flow connection to the gas compensating chamber (15), and the gas compensating chamber (15) changed in size response to the expansion and compression of the gas chamber wall (11, 12).

8 Claims, 3 Drawing Sheets

LASER MACHINE WITH GAS VOLUME COMPENSATION

BACKGROUND OF THE INVENTION

The present invention concerns a laser processing machine with a laser beam generator, a processing head movable relative to the generator, and a gas chamber containing a gas volume and connected to a gas compensating chamber, and in which the gas chamber at least partially provided a beam guidance chamber for the laser beam and is at least partially bounded by a extensible wall which is extensible and compressible with the motion of processing head relative to the laser beam generator.

Both the intensity and the shape of a laser beam are adversely affected by gases located in the beam path which absorb rays in the wavelength of the laser beam, for example, gases containing hydrocarbons. The resulting impairment becomes considerable in the case of laser processing machines, in which the laser beam has to cover a relatively long distance between the laser beam generator and the processing head. In order to avoid such impairment the laser beam usually is guided through a beam guidance chamber of the laser processing machine which is filled with a gas without harmful impurities.

The publication DE-U-295 09 648 describes a machine of this kind in which the gas chamber is bordered by bellows. In this case a part of the gas chamber serves as he beam guidance chamber, and another part as a secondary chamber which is connected with the beam guidance chamber; however, the laser beam does not pass through the secondary chamber which also is filled with gas. The gas chamber is connected by a flow connection with a compensating volume of gas in a gas supply tank, which is filled with gas under pressure. The gas from the gas supply tank enters the gas chamber at one end and leaves the gas chamber at the opposite end through a corresponding outlet. In this manner, the gas chamber is permanently washed with a gas having a desired composition and kept free from impurities. Of course, the operation of the previously known machine entails considerable gas consumption.

It is an object of the present invention to provide a novel laser processing machine with a substantially closed gas space of substantially constant volume which in part comprises an extensible and compressible conduit providing the laser beam path between the laser beam generator and processing head.

It is also an object to provide such a laser processing machine which can be fabricated readily and relatively economically.

Another object is to provide such a laser processing machine in which the interior volume of the closed chamber is automatically maintained substantially constant.

SUMMARY OF THE INVENTION

It has now been found that the foregoing and related objects may be readily attained in a laser processing machine in which the gas chamber providing the beam conduit is essentially closed apart from the flow connection with the gas compensating chamber and processing head, and in which the gas volume of the beam conduit is variable size because of the extension and contraction in the length of the conduit wall but is compensated by the concurrent expansion and contraction of the interior volume of the gas compensating chamber. Because of the use of a closed gas space, there is no need for a continuous and extensive gas supply. In a laser processing machine in accordance with the invention, gas is supplied to the gas chamber only as needed for replacement of leakage losses. The feature of the variability of the size of the gas equalization volume in the gas compensating chamber to compensate for lengthening and shortening of conduit wall ensures the functional capacity of the machine.

As will be readily apparent, dimensional variations of the gas chamber volume are caused by extension or contraction in the length of the wall of the guidance conduit because of the motion of the processing head relative to the laser generator. Generally, the wall of the beam guidance conduit is a bellows type closure which folds and unfolds as the processing head moves. The partial volume of the total volume of the gas chamber due to the folding of the gas chamber enclosed by the guidance conduit wall varies, depending upon the degree of the folding. In the case of tight folds, i.e., fold walls lying close beside one another, it is smaller than in operating situations in which the folds of the gas chamber wall are opened and the fold walls are spaced relatively far from one another. Corresponding fluctuations of the internal pressure prevailing in a closed gas chamber will result from the described volume fluctuations.

A decrease in volume of the gas chamber leads to an increase in pressure, and a volume increase leads to a pressure drop. In the case of a pressure increase as low as the millibar range, the folds of the gas chamber wall could be inverted outwardly, and the regular fold formation upon extension would be hindered. An increase in the gas chamber volume in a corresponding amount could result in a decrease of the internal pressure of the gas chamber to a level below the atmospheric pressure about the laser processing machine. In the case of simultaneous presence of leakage points in the gas chamber, it would be possible that, with this decreased pressure, the atmosphere in the environment of the laser processing machine, which may be contaminated with harmful gases, could be sucked into the gas chamber and thus into the beam guidance chamber.

By means of the gas compensating chamber in accordance with the present invention, these adverse phenomena can be avoided. In the present invention, as the gas chamber volume in the beam guidance chamber increases due to an extension the folds of the conduit wall as a result of the movement of the processing head relative to the laser beam generator. This volume increase is compensated by a corresponding decrease in the interior volume of the gas compensating chamber as gas flows from it into the conduit chamber. On the other hand, a decrease in the guidance conduit chamber volume as a result of a decrease in the length of the conduit during the operation of the laser processing machine leads to gas being forced from the conduit chamber into the gas compensating chamber and the interior volume of the latter is enlarged thereby. Thus, in laser processing machines in accordance with the invention, it is assured that the internal pressure of the combined gas space always maintains substantially the same value irrespective of the relative motion of processing head and laser beam generator.

The variation in volume of the gas compensating chamber is realized in a preferred embodiment of the invention by use of a volume compensating tank with a deformable, i.e., compressible or expansible, tank wall.

In accordance with the invention, in addition, or as an alternative to, the deformability of the tank wall, the gas compensating chamber may use a volume compensating tank, in which at least a part of the tank wall is movable relative to at least another part of the tank wall. In this connection, for example, it is conceivable to have a volume equalization tank in the form of a piston-cylinder unit, the piston of which is displaced with the folding or unfolding of the foldable beam conduit wall with expansion or reduction of the cylinder volume.

To compensate for pressure reduction in the compensating gas chamber which can result from the flow of gas from the gas compensating chamber into the beam conduit chamber, the invention advantageously provides for a force acting upon the wall of the volume compensating tank from outside. In laser processing machines in accordance with the invention which have a closed gas chamber provided by connection of the beam conduit chamber with the volume compensating tank, the described action of force on the tank wall of the volume compensating tank also can create pressure on its contents which is measured in such a way that, even in the case of an increase in the beam conduit volume as a result of an increase in the fold volume of the conduit wall, the internal pressure of the beam conduit does not reach a value below the ambient pressure on the laser processing machine, as a rule the atmospheric pressure.

As a simple design measure, the desired action of force on the wall of the volume compensating tank in the case of a preferred embodiment of the laser processing machine in accordance with the invention is achieved by using a contact weight.

As an alternative or supplement, it is possible to apply force to the container wall of the volume compensating tank by means of the controllable pressure device. With a corresponding control for the pressure device, it is possible to adjust the pressure exerted on the volume compensating tank to varying requirements.

In a structurally simple modification of the invention, the volume compensating tank is designed as an expansible or compressible bag—as provided in the case of a further version of the laser processing machine.

In a further configuration of the invention, in order to avoid flow losses, the gas compensating chamber is connected with the gas chamber by a flow channel, the cross-section of which is at least 10% of the cross-sectional area, in a given case the maximum cross-sectional area, of the gas compensating chamber.

BRIEF DESCRIPTION OF THE ATTACHED DRAWINGS

DETAILED DESCRIPTION OF THE PREFERRED EMBODIMENT

Figure 1:
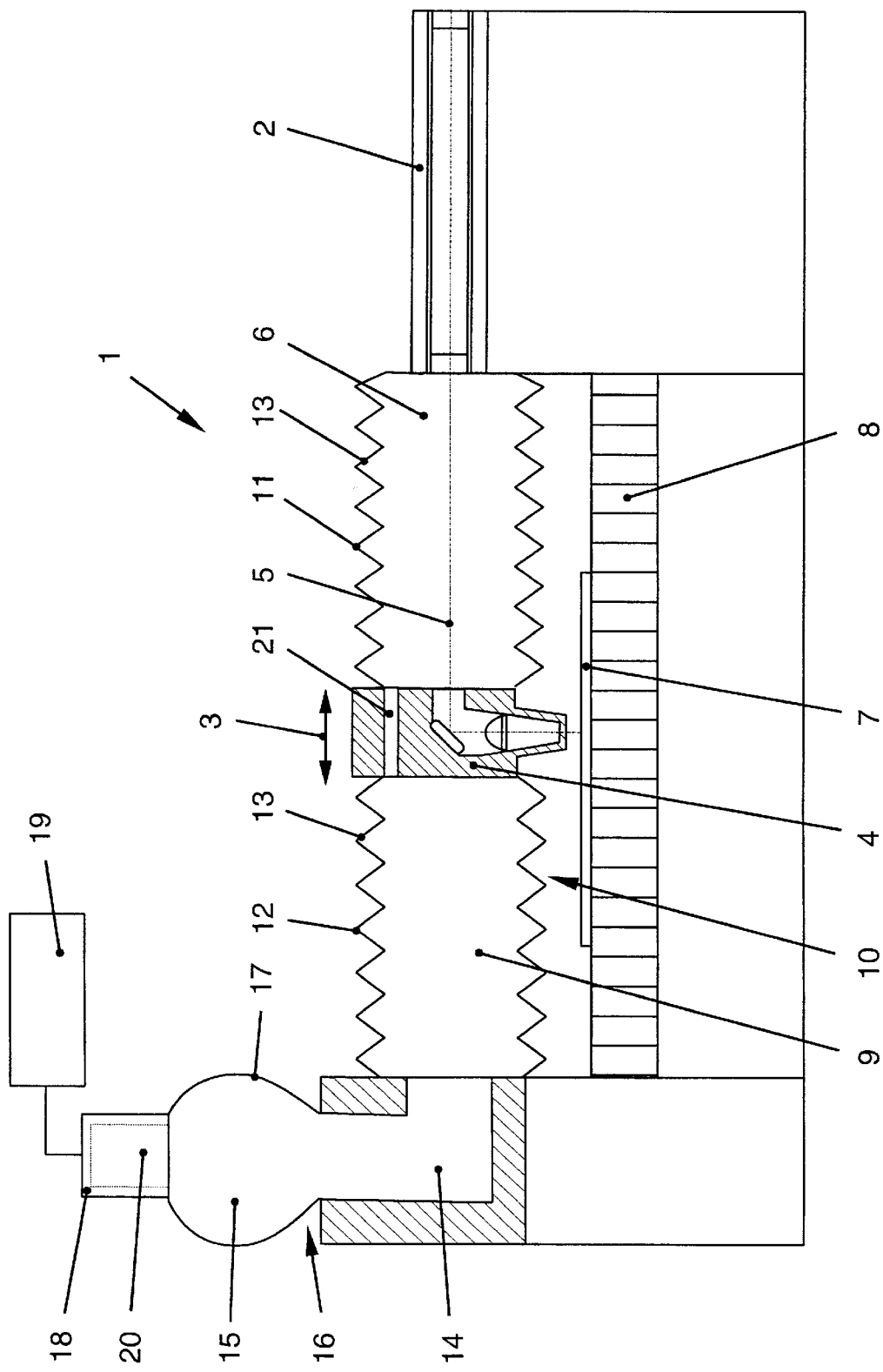
FIG. 1 is a diagrammatic illustration of a laser processing machine with a beam guidance gas chamber and gas compensating chamber showing the processing head in a first processing position.
Figure 2:
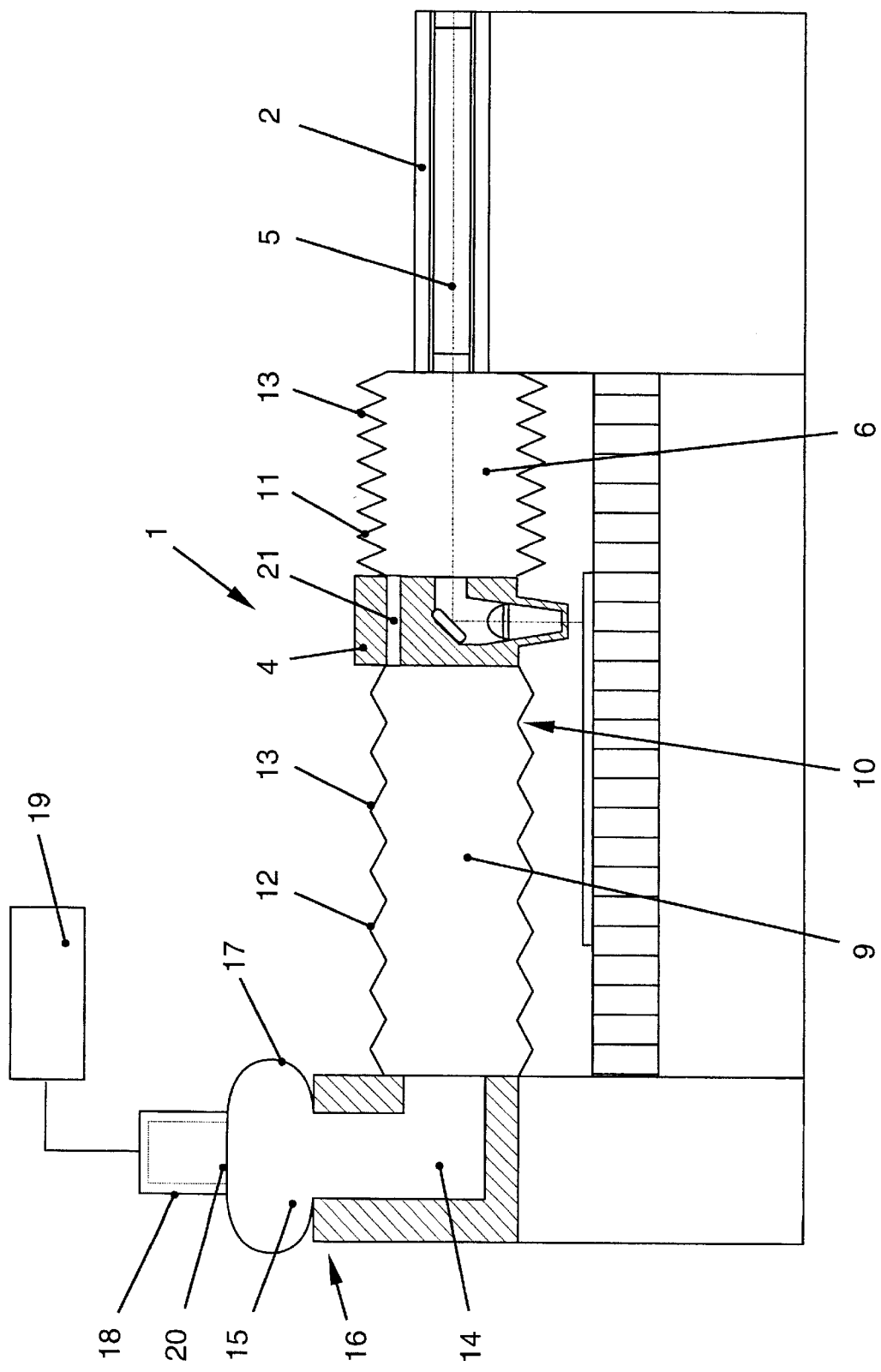
FIG. 2 is a similar illustration in a second processing position of the processing head.

In accordance with FIGS. 1 and 2, a laser processing machine 1 includes a laser beam generator 2 as well as a processing head 2 which is movable relative to the generator 2 in the direction of the double arrow 3. A laser beam 5 generated by the laser beam generator 2 is guided to the processing head 4 through a beam guidance chamber 6 provided by the extensible conduit wall 11, 12 and is directed onto a workpiece 7 to be processed which is in the form of a metal sheet placed on the workpiece support 8 of the laser processing machine 1.

The beam guidance chamber 6, together with a secondary chamber 9 located on the side of the processing head 4 opposite the generator 22, forms a gas chamber 10 which is filled with pure nitrogen gas. The beam guidance chamber 6 is bordered by the bellows 11, and the secondary chamber 9 is bordered by the bellows 12. The two bellows 11 and 12 form the gas chamber wall and in each case consist of a sequence of flexible folds 13.

The secondary chamber 9 is connected with a gas compensating chamber 15 by a flow channel 14. The gas compensating chamber 15 is located in the interior of a bag-like volume compensating tank 16 with an expansible and compressible tank wall 17. A pressure device 18 acts upon the wall 17 from the outside, and a pressure control device 19 controls the pressure device 18 with respect to the force which it exerts upon the tank wall 17. A contact weight 20 exerts pressure on the container wall 17 and is provided as an alternative, or in addition, to the controllable pressure device 18. A cross-flow channel 21 in the processing head 4 connects the beam guidance chamber 14 with the secondary chamber 9 and which is connected by the flow channel 14 to the gas compensating chamber 15. The gas chamber 10 is closed to the atmosphere in the environment of the laser processing machine 1 as is the gas compensating chamber 15. Therefore, the gas chamber 10 and gas compensating chamber 15 together form gas containing space which is a closed system into which pure nitrogen gas is supplied only to compensate for leakage losses.

If, for example in the course of the processing of the workpiece, the processing head 4 is displaced to the right from its position shown in FIG. 1, the wall of the bellows 11 is folded or compressed, and the spacing between folds 13 is narrowed. The described folding of the bellows 11 is accompanied by an unfolding or expansion of the bellows 12, and its folds 13 open correspondingly. Gas flows from the bellows 11 through the cross-flow channel 21 into the bellows 12. The situation shown in FIG. 2 is at the end of the illustrative processing motion of the processing head 4.

As opposed to the initial position in FIG. 1, the volume enclosed by the folds 13 of the bellows 11 is reduced less than the increase in the volume of the folds 13 of the bellows 12. The total volume of the folds 13 of the bellows 11 and 12 thus is greater in the case of the position of the processing head 4 shown in FIG. 2 than the corresponding volume in the case of the position of the processing head 4 shown in FIG. 1. As a consequence of this, the volume of the gas chamber 10 in accordance with FIG. 2 is increased as compared with the condition shown in FIG. 1. This difference in volume is filled by gas flowing from the gas compensating chamber 15. It is possible to keep the inner pressure of the gas chamber 10 constant by means of the described volume equalization, so that in the position of the processing head 4 in accordance with FIG. 2, the pressure has the same value as in the case of the position of the processing head in FIG. 1.

In FIG. 2 the contact weight 20, which exerts force on the tank wall 17 of the volume compensating tank 16, has descended as compared with its initial position in FIG. 1, and this corresponds to the reduction in interior volume of the gas compensating chamber 15.

If the processing head 4 moves back from its position in FIG. 2 into the position shown in FIG. 1, there is a reduction of the volume of the gas chamber 10. As a result of this volume reduction, gas flows from the gas chamber 10 into the gas compensating chamber 15. The pressure in the interior of the gas chamber 10 remains constant as a consequence of this, and the gas compensating chamber 15 resumes its initial size, and the contact weight 20 resumes its initial position.

Figure 3:
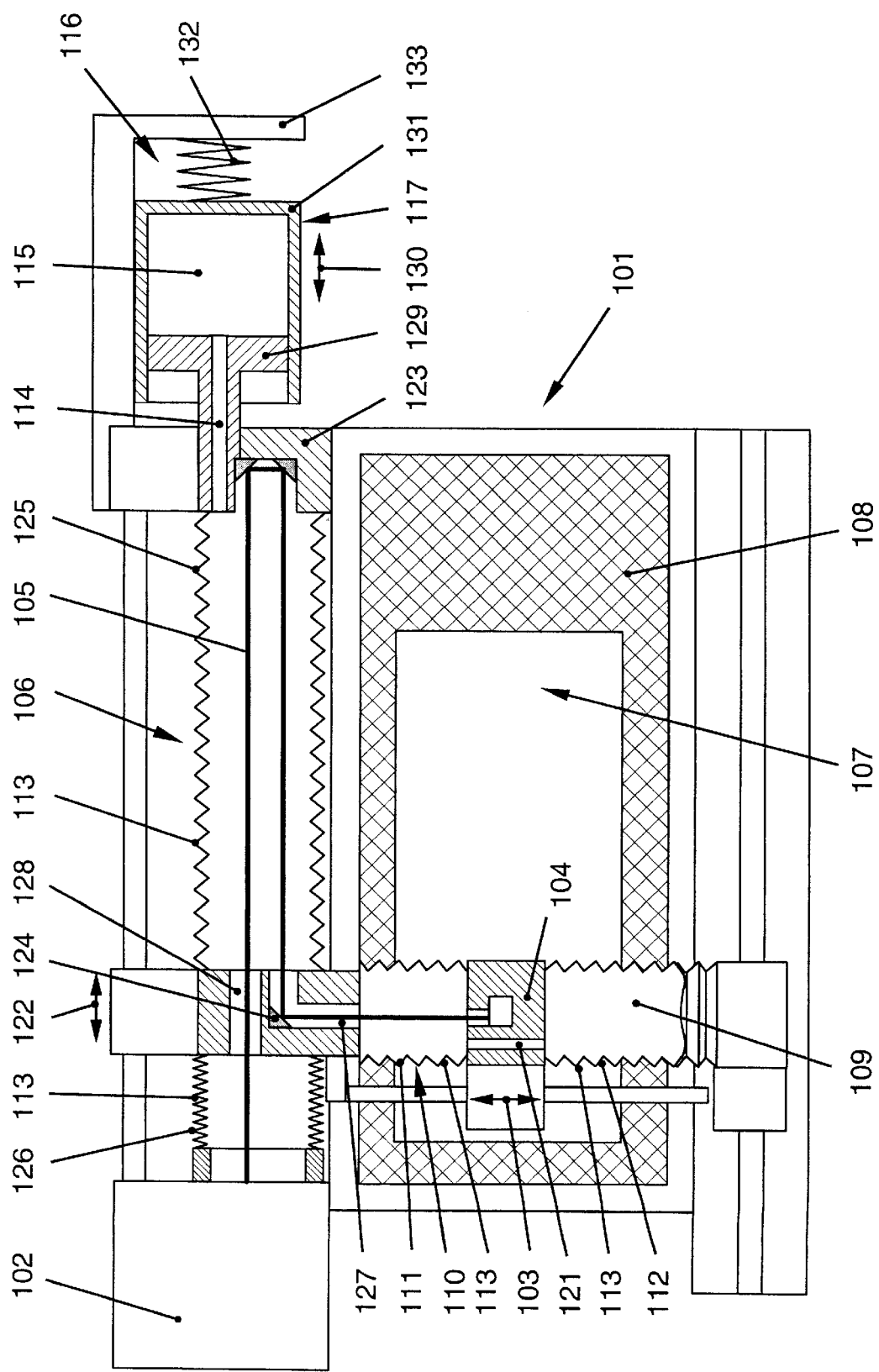
FIG. 3 is a diagrammatic illustration of a laser processing machine with an alternate embodiment of a gas compensating chamber.

In an alternate embodiment of laser processing machine 101 shown in FIG. 3, the processing head 104 can be moved in two axes, namely in the direction of a double arrow 103 as well as perpendicularly thereto in the direction of a double arrow 122. The laser beam 105 is guided, starting from the laser generator 102, to a first beam guidance device 123 to a second beam guidance device 124, to the processing head 104, and thence onto the workpiece 107. The workpiece 107 rests on a fixed workpiece support 108.

The beam guidance chamber 106 is bordered by a total of three bellows, namely by the bellows 111 located between the second beam guidance conduit 124 and the processing head 104, the bellows 125 extending between the first beam guidance device 123 and the second beam guidance device 124, and the bellows 126 connecting the laser beam generator 102 with the second beam guidance device 124. A secondary chamber 109 is provided on the side of the processing head 104 opposite from the bellows 111 and is connected with the interior of the bellows 111 by the cross flow channel 121. The connection between the interior of the bellows 111, 125 is created by a connecting channel 127 on the second beam guidance device 124. A passage 128 in the second beam guidance device 124 creates a connection between the inner chamber of the bellows 125 and the inner chamber of the bellows 126. The beam guidance chamber 106 and the secondary chamber 109 form the gas chamber 110. All bellows 111, 112, 125 and 126 are formed by a sequence of flexible folds 113.

A flow channel 114 connects the gas chamber 110 with the gas compensating chamber 115 and opens into the inner chamber of the bellows 125. The gas compensating chamber 125 is located in the interior of a volume compensating tank 116 which has a tank wall 117 with a stationary part 129 as well as a part 131 which is movable relative to it in the direction of a double arrow 130. A compression spring exerts force on the movable part 131 of the tank wall 117. The compression spring 132 is supported with its end opposite the volume compensating tank 116 on a counterbearing 133 fixed on the machine. Both the gas chamber 110 and the volume compensating tank 116 contain pure nitrogen gas. Both the guidance gas chamber 110 and the compensating chamber 115 are closed with the respect to the environment about the laser processing machine 101, and nitrogen gas is supplied only to compensate for leakage losses.

Corresponding to the manner described in detail previously for FIGS. 1 and 2, the gas compensating chamber 115 serves to compensate for variation in the internal volume and pressure prevailing in the gas chamber 110. The volume of the guidance gas chamber 110 is subject to dimensional fluctuations which are to be attributed both to the motion of the processing head 104 in the direction of the double arrow 103 as well as to the motion of the processing head 104 in the direction of the double arrow 122.

The motion of the second beam guidance device 124 coupled to the processing head 104 necessarily is related to the motion of the processing head 104 in the direction of the double arrow 122. As a result of the folding or, unfolding of the bellows 111, 112, 125 and 126 forming the gas chamber wall which takes place with the motion of the processing head 104, the volume of the gas chamber 110, and with this the volume of the gas compensating chamber 115, increase and decrease, which again leads to a displacement of the movable part 131 of the tank wall 117 of the volume compensating tank 116 with respect to the fixed part 129 in the direction of the double arrow 130.

It will be appreciated from the illustrated embodiments that other structures may be utilized to provide a gas compensating chamber which increases or decreases in volume as required to compensate for the increases and decreases in volume of the gas chamber so that the pressure of the system remains substantially constant. The flexible bellows arrangement for the gas chamber which is illustrated is the most readily adapted to providing a sealed system although telescoping elements may also be utilized albeit with greater problems in effecting the desired sealing action.

Thus, it can be seen from the foregoing detailed description and attached drawings that the laser processing machine of the present invention is one in which a closed gas space is provided to eliminate the need for constant flow of inert gas such as nitrogen into the processing machine. The several embodiments illustrated are of constructions which may be readily fabricated.

Having thus described the invention, what is claimed is:

1. A laser processing machine comprising:
   (a) a laser beam generator (2, 102);
   (b) a laser beam processing head (4, 104) movable relative to said laser beam generator; and
   (c) a gas chamber (10, 110) including a beam guidance chamber (6,106) between said processing head (4,104) and said beam generator (2,102) and a secondary chamber (9,109) extending to the opposite side of said processing head, said gas chamber (10,110) being connected to a gas compensating chamber (15, 115), said beam guidance chamber (6, 106) providing a path for the laser beam (5,105) from the beam generator (2,102) to the processing head (4,104) said guidance and secondary chambers (9,109, 6,106) being at least partially bounded by a bellows providing an extensible and compressible chamber wall (11, 12; 111, 112, 125, 126) defined by a series of folds which are extended and compressed with the motion of said processing head (4,104) relative to said laser beam generator (2, 102), said gas chamber (10,110) being of fixed length and of variable volume, said gas chamber (10, 110) and said gas compensating chamber (15,115) being substantially closed apart from the connection with said processing head (4,104), the volume of said gas compensating chamber (15, 115) being expansible and compressible upon extension and compression of said folds of said beam guidance and secondary chamber walls (11, 12, 111, 112, 125, 126) and thereby the variation in interior volume bounded by said extensible and compressible folds of said guidance and secondary chamber walls.

2. A laser processing machine in accordance with claim 1 wherein said gas compensating chamber is bounded at least in part by an expansible and compressible wall in response to variation in the interior volume.

3. A laser processing machine in accordance with claim 1 wherein said gas compensating chamber (115) is provided at least in part by a volume compensating tank (116) with a tank wall (117) having a portion which is movable relative to at least one other portion (129, 131) of the tank wall (117) to accommodate expansion and compression of the interior volume.

4. A laser processing machine in accordance with claim 3 wherein there is included means exerting a force on a portion of wall (17, 117) volume compensating tank (16, 116).

5. A laser processing machine in accordance with claim 4 wherein said force exerting means is a contact weight (20).

6. A laser processing machine in accordance with claim 4 wherein said force exerting means is a controllable pressure device (18).

7. A laser processing machine in accordance with claim 3 wherein said volume compensating tank (16) is provided at least in part by an extensible and compressible bag-like member.

8. A laser processing machine in accordance with claim 1 wherein said gas compensating chamber (15, 115) is connected with said gas chamber (10, 110) by a conduit (14, 114) having a cross sectional area which is at least 10% of the size of the cross sectional area of the maximum cross sectional area of said gas compensating chamber (15, 115).

* * * * *